US011796047B2

United States Patent
Ries-Mueller

(10) Patent No.: US 11,796,047 B2
(45) Date of Patent: Oct. 24, 2023

(54) METHOD FOR DETERMINING THE TRANSMISSION BACKLASH OF A TRANSMISSION

(71) Applicant: Robert Bosch GmbH, Stuttgart (DE)

(72) Inventor: Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 468 days.

(21) Appl. No.: 17/277,804

(22) PCT Filed: Aug. 22, 2019

(86) PCT No.: PCT/EP2019/072475
§ 371 (c)(1),
(2) Date: Mar. 19, 2021

(87) PCT Pub. No.: WO2020/057892
PCT Pub. Date: Mar. 26, 2020

(65) Prior Publication Data
US 2021/0317906 A1 Oct. 14, 2021

(30) Foreign Application Priority Data
Sep. 19, 2018 (DE) ...................... 10 2018 215 894.0

(51) Int. Cl.
*F16H 57/01* (2012.01)
*G01M 13/028* (2019.01)
(Continued)

(52) U.S. Cl.
CPC .......... *F16H 57/01* (2013.01); *G01M 13/028* (2013.01); *B60L 2270/14* (2013.01);
(Continued)

(58) Field of Classification Search
CPC .. F16H 57/01; F16H 2057/018; F16H 1/2863; G01M 13/02; G01M 13/021;
(Continued)

(56) References Cited

U.S. PATENT DOCUMENTS 7,877,184 B2 * 1/2011 Watanabe ................ B60K 6/40
  903/906
8,290,651 B2 * 10/2012 Park ................ B60W 30/18009
  180/65.21
(Continued)

FOREIGN PATENT DOCUMENTS

DE         10119724 A1     2/2003
DE     102007030800 A1     1/2009
(Continued)

OTHER PUBLICATIONS

Translation of International Search Report for Application No. PCT/EP2019/072475 dated Dec. 3, 2019 (2 pages).

*Primary Examiner* — Tinh Dang
(74) *Attorney, Agent, or Firm* — Michael Best & Friedrich LLP

(57) ABSTRACT

The invention relates to a method for ascertaining the backlash (40) of a gear (24) which is coupled to an electric machine (12) of a vehicle which has at least one electric machine (12). According to the method, at least the following steps are carried out: a) detecting the rotational speed of the at least one electric machine (12) during a driving intervention (80) and detecting rotational speed fluctuations produced therefrom, b) evaluating a high-frequency vibration (60) which is generated as a result of the gear (24) reaching a lower stop (54) in delay phases (56) and reaching an upper stop (50) when reversing the rotational direction in acceleration phases (58), c) filtering out high-frequency components from the high-frequency vibration (60) according to step b), wherein position information (42), relating to a corresponding rotational angle, from the rotational speed signal is saved in the event said components occur, and d) evaluating the distance between the upper stop (52) and the lower stop (54) and ascertaining the backlash (40) from the difference of the position information (42) between the upper stop (52) and the lower stop (54).

10 Claims, 4 Drawing Sheets

(51) Int. Cl.
*B60W 20/17* (2016.01)
*G01M 13/02* (2019.01)
*G01M 13/021* (2019.01)

(52) U.S. Cl.
CPC ........ *B60L 2270/142* (2013.01); *B60W 20/17* (2016.01); *F16H 2057/018* (2013.01); *G01M 13/02* (2013.01); *G01M 13/021* (2013.01)

(58) Field of Classification Search
CPC . G01M 13/028; B60W 20/17; B60L 2270/14; B60L 2270/142
See application file for complete search history.

(56) References Cited

U.S. PATENT DOCUMENTS

| | | | | |
|---|---|---|---|---|
| 9,903,460 | B2* | 2/2018 | Trönnberg | .............. F16H 55/18 |
| 2008/0004780 | A1* | 1/2008 | Watanabe | .............. B60K 6/445 |
| | | | | 903/917 |
| 2010/0235027 | A1* | 9/2010 | Park | ................ B60W 30/18009 |
| | | | | 180/65.21 |
| 2016/0305529 | A1* | 10/2016 | Trönnberg | .............. F16H 55/18 |

FOREIGN PATENT DOCUMENTS

| | | | | | |
|---|---|---|---|---|---|
| DE | 102011121789 | A1 | | 6/2013 | |
| DE | 102012011757 | A1 | | 12/2013 | |
| DE | 102015120263 | A1 | | 5/2017 | |
| EP | 1006040 | A1 | * | 6/2000 | ........... B62D 5/0403 |
| JP | H09130911 | A | * | 5/1997 | ........ B60W 2552/15 |
| JP | 2010125986 | A | * | 6/2010 | |

* cited by examiner

METHOD FOR DETERMINING THE TRANSMISSION BACKLASH OF A TRANSMISSION

BACKGROUND OF THE INVENTION

The invention relates to a method for determining the transmission backlash of a transmission which is coupled to an electric machine of at least one vehicle having an electric machine.

DE 10 2015 120 263 A1 relates to a method for determining the wear in an arrangement in which an engine moves a load via a transmission device, for example a transmission. The motor is assigned a first incremental signal encoder, and the load is assigned a second incremental signal encoder. A measuring difference between the two incremental signal encoders is determined at a specific load, wherein the measuring difference can be an angular difference. An amplitude of an oscillation which is described by the measuring difference is subsequently determined and an amplitude function is calculated in accordance with the determined amplitudes. This amplitude function is compared with stored characteristic functions in order to select at least one subsequent characteristic function from the stored characteristic functions. The subsequent characteristic function provides information about the type of prevailing nonlinearity of the transmission device and therefore permits conclusions to be drawn about the type of wear, such as for example the occurrence of transmission backlash.

DE 10 2012 011 757 A1 discloses a method for detecting rotational backlash of a drive train of a vehicle. A rotational speed difference is determined between the engine rotational speed and a reference rotational speed which is formed, for example, by multiplying the actually measured wheel rotational speed with the transmission ratio of the transmission, before a transition from an overrun mode into a traction mode of the vehicle. In this context, the engine rotational speed can be detected by an engine control unit and the reference rotational speed can be detected by a brake control unit. This rotational speed difference is integrated over time until despite a torque which continues to be positive at either a decrease in the engine rotational speed is detected at the drive train, or the difference between the engine rotational speed and the reference rotational speed has essentially assumed again the value before the time of the transition from the overrun mode into the traction mode.

The subject matter of DE 10 2007 030 800 A1 is a method for controlling a mechanical output variable of a transmission. In this context, transmission settings measure two different locations on the transmission which are connected to the drive, and the difference between said positions is adjusted as a control variable. A transmission position according to DE 10 2007 030 800 A1 is an angular position of a transmission shaft or its rotational angle. The difference between the two measured transmission positions from one another is continuously monitored and evaluated in order to detect sensor errors or mechanical defects as well as to monitor a transmission backlash. In this context, the difference is compared with a specified permissible value.

In future, vehicles will be increasingly used with electric axle drives particularly as battery-type electric vehicles. In this context, the power electronics are mounted directly on the electric machine, since as a result it is possible, inter alia, to achieve a saving in terms of cable connections and plugs. In this context, the electric machine, the transmission and the power electronics are preferably combined to form an electric drive axle, an electric axle module. The transmission is typically composed of a fixed transmission means without gear stages, without a clutch and without a torsional damper. For the transmission backlash it is necessary to comply with precise tolerance requirements of the automobile manufacturers which are considered over the service life of the vehicle. Owing to the highly dynamic electric drive, the transmission backlash has a large effect on the drivability.

SUMMARY OF THE INVENTION

According to the invention, a method for determining a transmission backlash of a transmission which is coupled to an electric machine of a vehicle having at least one electric machine is proposed, in which method at least the following method steps are run through:

a) detecting the rotational speed of the at least one electric machine in the case of a driving intervention and detecting fluctuations in rotational speed which originate therefrom, b) evaluating a high-frequency oscillation generated by the transmission reaching a lower stop during deceleration phases and by the transmission reaching an upper stop when there is a reversal of the direction of rotation in acceleration phases, c) filtering out high-frequency portions from the high-frequency oscillation according to b), at the occurrence of which position information relating to an associated rotational angle from the rotational speed signal is stored, d) evaluating a distance between the upper stop and the lower stop and determining the transmission backlash from the difference between the position information for the upper stop and that for the lower stop.

In one development of the method proposed according to the invention, the driving intervention is, for example, an ABS intervention, i.e. locking and release of the wheels of the vehicle again in an intermittent fashion, or a simple braking intervention or braking within the scope of a recuperation function for converting kinetic energy into electrical energy in order to recharge the traction battery.

In the method according to the invention, the determined transmission backlash is stored as a function of the service life of the vehicle or also the kilometerage of the vehicle. On the basis of the stored data of the transmission backlash it is possible to infer, on the basis of an increase in the transmission backlash, uniform aging as a result of mechanical wear of the transmission. According to the method proposed according to the invention, transmission backlash is averaged over a plurality of driving interventions over a specific distance traveled, wherein a comparison of the mean values of the transmission backlash is also carried out.

If a first gradient for a general rise in the mean values of the transmission backlash is detected here over the kilometrage or the service life of the vehicle, customary aging of the components of the transmission can be inferred, for example mechanical abrasion of the intermeshing tooth edges of the gear wheels of the transmission can be inferred. If a second gradient with a steeper profile is detected for the rise in the mean values of the transmission backlash, and it is detected that a diagnostic threshold is exceeded, a defect in the transmission and/or in the at least one electric machine can be inferred. The first gradient and the second gradient are determined on the basis of the respective mean values of the determined instances of transmission backlash. When the diagnostic threshold values are exceeded by at least one mean value of the transmission backlash, an entry is made in a fault memory of the vehicle, which entry is read out within the scope of routine investigations or within the scope of inspection deadlines. When a diagnostic threshold value is exceeded by a mean value of the determined transmission backlash it is possible to generate an immediate fault message, and to output an indication that a workshop should be looked for.

In reaction to the determined gradients, the first gradient for an increase in the mean values of the transmission backlash with respect to customary aging or with respect to a second gradient with a steeper profile when there is an increase in the mean values of the transmission backlash in the case of an imminent defect, in reaction thereto it is possible to specify a reduction in the torque of the at least one electric machine in an acceleration phase of the vehicle, in order to ensure the drivability of the vehicle, for example up to the next regular inspection deadline or as far as the nearest workshop.

In the method according to the invention, the mean values of the transmission backlash can be taken into account in drivability functions, in particular an anti-judder function. Drivability functions advantageously influence the driving comfort. The anti-judder function constitutes one of these drivability functions and forms part of the torque control system. The anti-judder function serves, on the one hand, to improve the driving comfort and, on the other hand, to protect vehicle components, such as for example the transmission, differential and transmission elements. When there is an abrupt change in torque, for example, the anti-judder function ensures that the necessary torque is adapted within less than 100 ms. This makes it possible to avoid negative effects, extending on the drive train, of abrupt changes in torque which can lead to oscillations in the drive train and damage to the abovementioned components. The anti-judder function avoids mechanical vibrations. The anti-judder function intervenes to a lesser extent at high speeds owing to the changes in torque which are less frequent then, and said function is, for example, not active at all at the maximum speed of the at least one electric machine.

In the method proposed according to the invention, there is alternatively the possibility of evaluating the rotational speed signals according to method step a) by means of a frequency analysis, in particular a fast Fourier transformation, and of inferring a change in the transmission backlash when high-frequency portions change.

Advantages of the Invention

The method proposed according to the invention advantageously provides a possible way of permitting, when viewed over the service life of a vehicle, the detection of a changing transmission backlash. The detection of the transmission backlash can be used in a preventative fashion in particular within the scope of the detection of faults, as soon as the transmission backlash exceeds a specified threshold value. In the preliminary stages it is possible to detect imminent defects before the drivability of the vehicle is significantly effected.

As long as the drivability of the vehicle is given, warning indications to the driver are output from the exceeding of diagnostic threshold values by the determined mean values of the transmission backlash, or the permissible torque which the at least one electric machine applies during the acceleration phase of the vehicle can be advantageously reduced so that the torque loading of a possibly previously damaged transmission is decreased and therefore the drivability of the vehicle continues to be ensured until remedy measures can be taken. The detected transmission backlash of the mean values thereof can be used in various functions for improving the drivability. An improvement in the drivability can occur, for example, by using the anti-judder function, with the effect that the limitation of the torque or the dynamics at the drive is controlled. It is therefore possible, for example in the case of a relatively large backlash being determined in the transmission, to limit the vehicle acceleration to a maximum acceleration and as a result reduce the dynamics, which considerably reduces the mechanical loading on the components of the drive train.

BRIEF DESCRIPTION OF THE DRAWINGS

The invention will be described in more detail below with reference to the drawing, in which.

DETAILED DESCRIPTION

Figure 1:
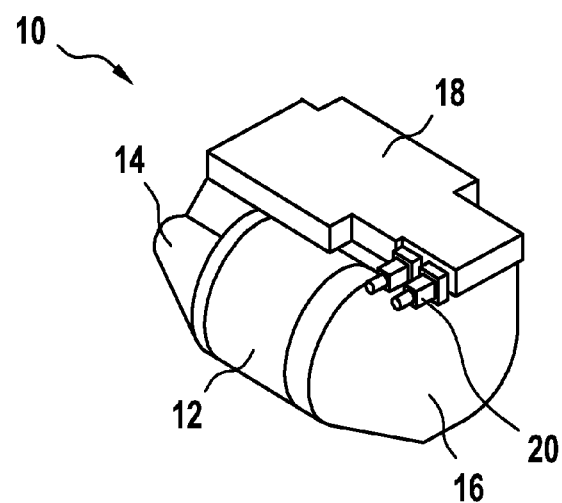
FIG. 1 shows a view of part of an electric axle module.

The illustration according to FIG. 1 shows part of an electric axle module 10. The electric axle module 10 comprises a first housing part 14 and a second housing part 16. Power electronics 18 on which electrical connections 20 are formed are located on the two housing parts 14 and 16.

Figure 2:
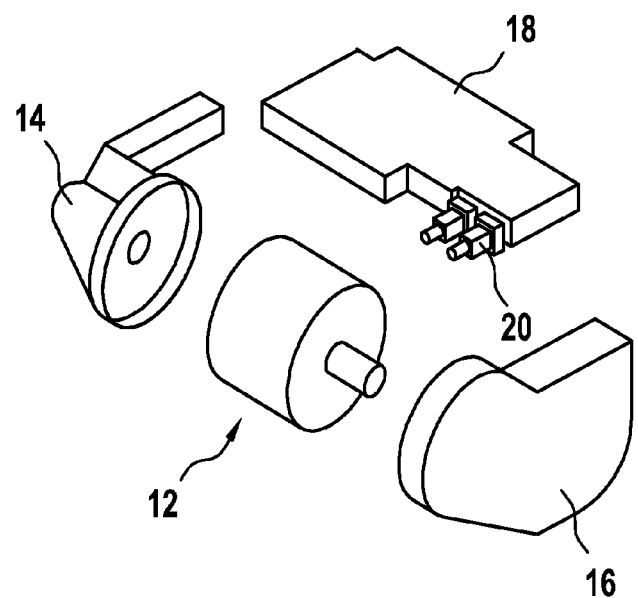
FIG. 2 shows an exploded illustration of the electric axle module according to FIG. 1 with a schematically indicated electric machine.

FIG. 2 shows the electric axle module 10 according to the illustration in FIG. 1 in an exploded illustration. From the illustration according to FIG. 2 it is apparent that an electric machine 12 is arranged in the first housing part 14 and in the second housing part 16. The power electronics 18 with electrical connections 20 formed thereon are accommodated on the two housing parts 14 and 16, in their mounted state.

Figure 3:
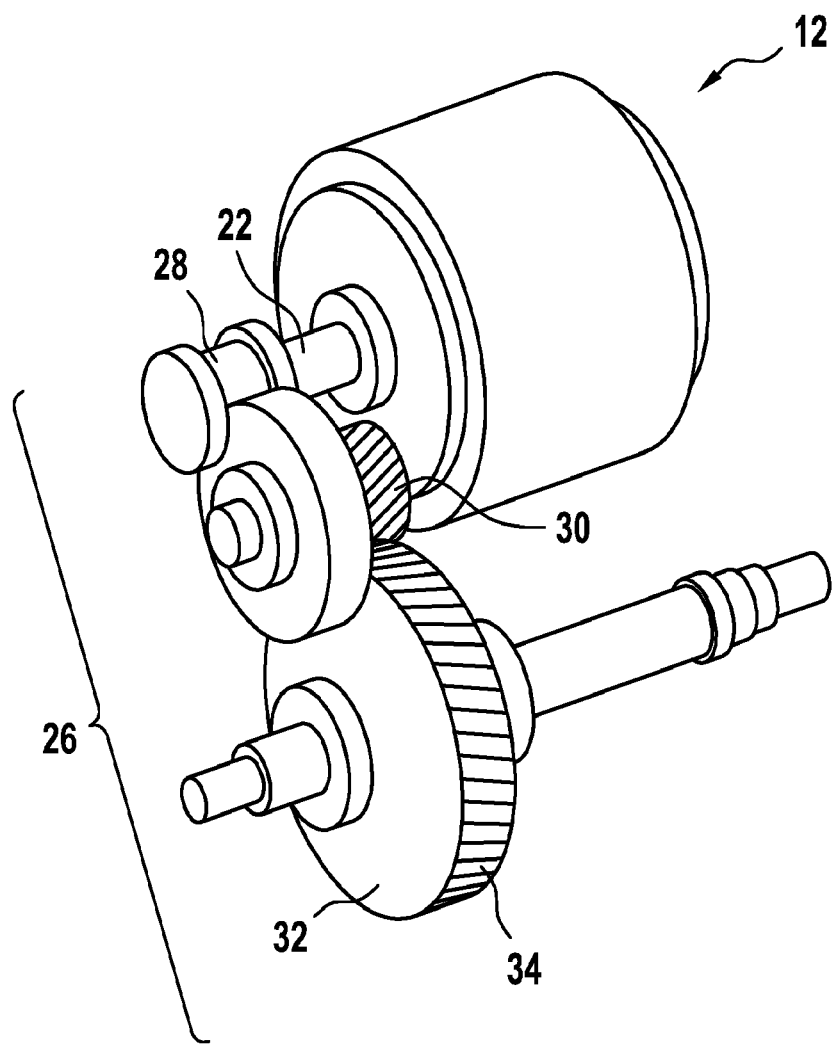
FIG. 3 shows a perspective view of a transmission.

FIG. 3 shows an electric machine 12, by means of whose output 22 a transmission 24 is driven. The transmission 24 in the illustration according to FIG. 3 is a spur gear stage 26. The latter comprises a pinion 28 which is accommodated on the output 22 of the electric machine 12. The pinion 28 meshes with an intermediate gear 30, which in turn drives a spur gear 32 which is accommodated on a separate shaft. For reasons of the generation of sound, i.e. in order to achieve low noise emissions by the transmission 24, the toothing arrangements of the pinion 28, of the intermediate gear 30 and of the spur gear 32 of the spur gear stage 26 are embodied as helical gearing arrangements 34.

Figure 4:
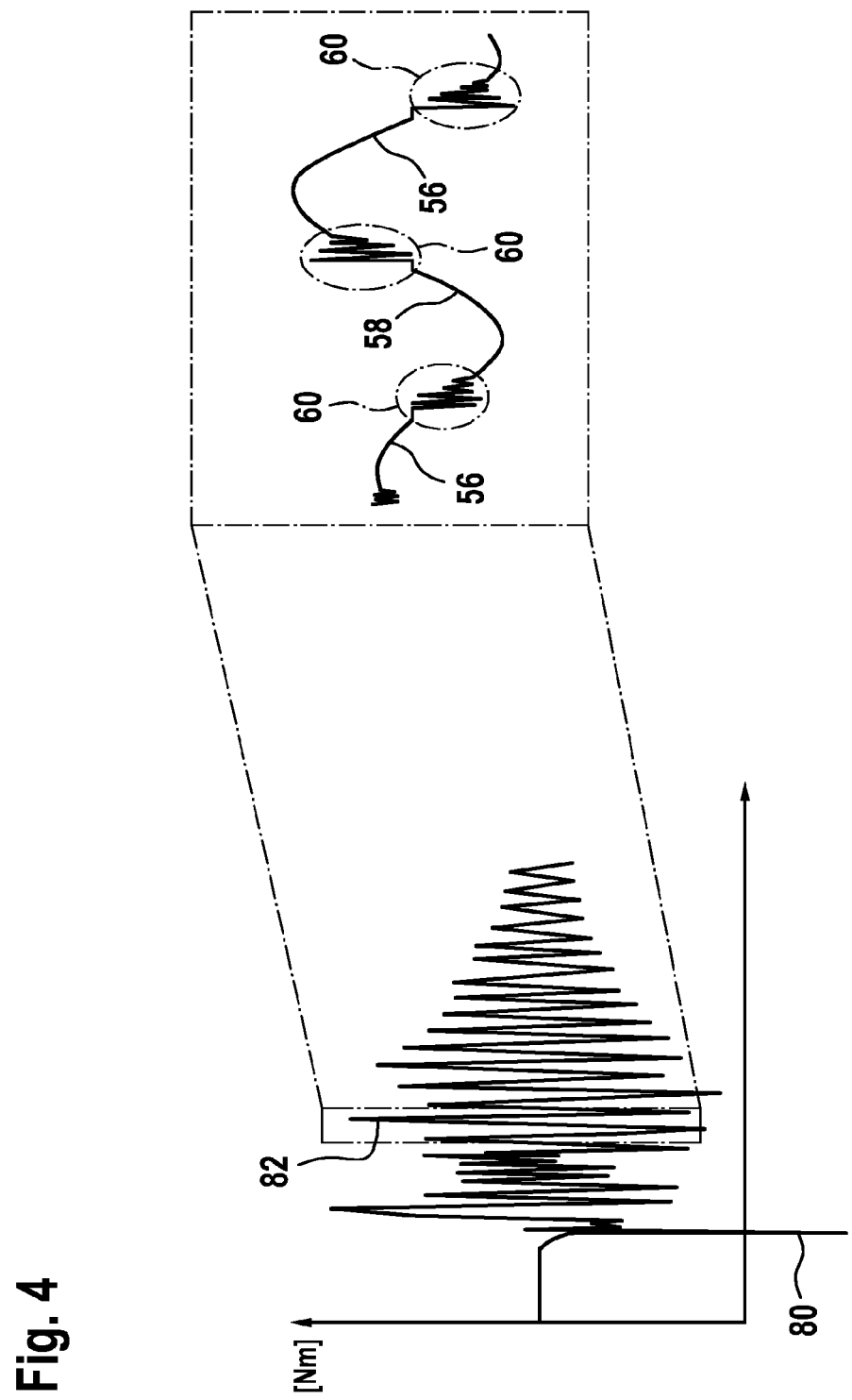
FIG. 4 shows an evaluation of a driving intervention.

FIG. 4 shows an evaluation of a driving engagement.

A sequence of the method proposed according to the invention is as follows:

When there is a driving intervention 80, for example a braking intervention within the scope of the intervention of the ABS system of the vehicle, the rotational speed of the at least one electric machine 12 is detected and evaluated. The transmission backlash 40 is determined as described above. Continuous storage of the determined value 50 for the transmission backlash 40 is carried out, for example, as a function of the service life of the vehicle or the kilometerage of the vehicle. When there is a renewed driving intervention 80, e.g. an ABS intervention, a value 50 for a transmission backlash 40 is determined anew.

Averaging of the detected instances of transmission backlash 40, i.e. the determination of mean values 62 for the transmission backlash 40, takes place over a plurality of braking interventions over a specific driving distance, for example averaging of the transmission backlash, GS_M=mean of transmission backlash 1 to transmission backlash 5 is taken, or within a specific driving distance, for example up to 5000 km kilometerage 64 of the vehicle. The mean values 62 are then compared over the service life of the vehicle. The averaged transmission backlash is taken into account in drivability functions such as, for example, the anti-judder damping. Reference symbol 82 denotes a window of fluctuation in the rotational speed, which is highlighted in an enlarged form in FIG. 4 and comprises deceleration phases 56 and acceleration phases 58.

In the event of the averaged transmission backlash 40 exceeding a fault threshold value, an entry is made in a fault memory. A consequence of this upward transgression (cf. illustration according to FIG. 6) is, for example, a reduction in the torque which is set by means of the at least one electric machine 12, for example in acceleration phases 58 or in recuperation phases for converting kinetic energy into electrical energy.

Figure 5:
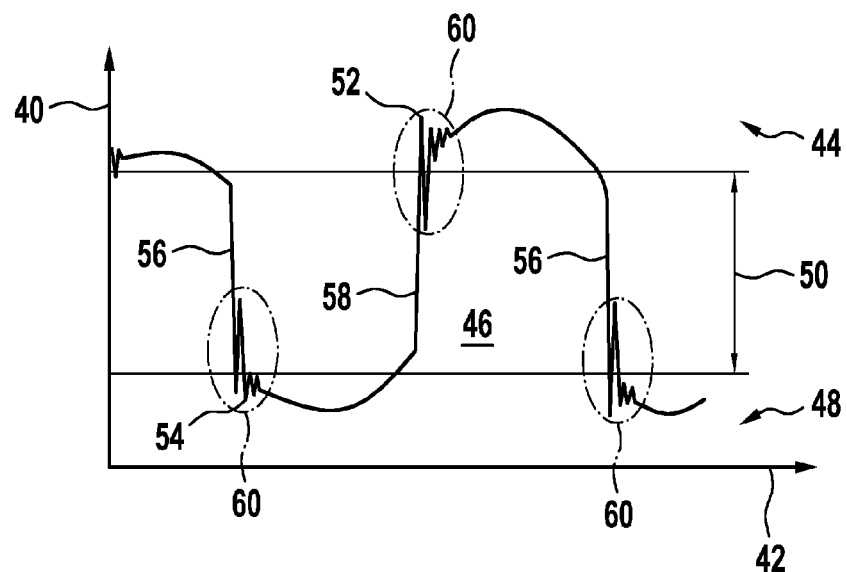
FIG. 5 shows an illustration of an upper stop for the transmission or a lower stop for the transmission when there is a reversal of the direction of rotation.

FIG. 5 is an illustration of the profile of the transmission backlash plotted against a rotational angle/position information.

In the case of a driving intervention 80, for example braking which is initiated by the driver or an ABS intervention which is initiated by the ABS control system, or in the case of braking for energy recuperation, i.e. for converting kinetic energy into electrical energy, fluctuations in rotational speed occur which comprise deceleration phases 56 and acceleration phases 58. These fluctuations in the rotational speed occur in the drive train and therefore also at the at least one electric machine 12 as well as at the transmission 24. Within the scope of the deceleration phase 56, when the wheel of the vehicle is braked the transmission 24 or the drive train is briefly moved up to a lower stop 54. Within the scope of the fluctuations in the rotational speed, an upper stop 52 is reached by the transmission 24 in the opposite direction of rotation during the acceleration of the wheel, for example when the brake is briefly released. This "brief abutment" causes a high-frequency oscillation to occur. The term "abutment" or the upper stop 52 and the lower stop 54 are to be understood within the present context as meaning that intermeshing teeth make contact with the edges within the spur gear stage 26 either within a first contact region 44 or a second contact region 48. Within the "transmission free" region 46 which is illustrated in FIG. 5, the edges of the teeth which mesh with one another, of the spur gear stage 26, are actually not in contact. As is apparent from FIG. 4, the brief "abutment", i.e. the briefly occurring contact between the edges of the teeth of pinions 28 which mesh with one another, the intermediate gear 30 and the spur gear 32, brings about a rapidly decaying high-frequency oscillation 60. Through the evaluation of the distance between the upper stop 52 (positive stop) and the lower stop 54 (negative stop) it is possible to determine the transmission backlash 40—in the example illustrated in FIG. 5 the value 50 for the transmission backlash 40 is 0.2 mm. For this the high-frequency portions from the high-frequency oscillation 60 are filtered out. Whenever these occur, i.e. corresponding signals at the filter output exceed a threshold value, the associated position information 42, i.e. the rotational angle, is stored. A value 50 for the transmission backlash 40 can be determined from the difference between the position information 42 relating to the rotational angle at which the upper stop 52 is reached and that relating to the rotational angle at which the lower stop 54 is reached.

Alternatively, there is also the possibility of subjecting the rotational speed signal according to method step a) also to a frequency analysis, for example a fast Fourier transformation. By changing, for example, the high-frequency portions it is possible to infer a change in the transmission backlash 40.

Figure 6:
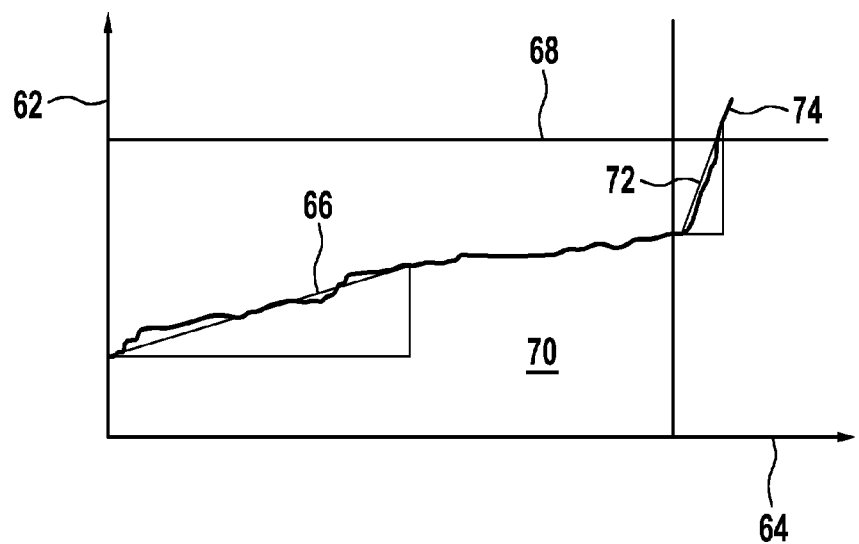
FIG. 6 shows an illustration of a mean value progression of the transmission backlash plotted over the kilometerage of a vehicle.

The illustration according to FIG. 6 is the averaged transmission backlash plotted against the kilometerage 64 of the vehicle.

From the illustration according to FIG. 6 it is apparent that the mean values 62 for the transmission backlash 40 increase over the service life of the vehicle or over the kilometerage 64 of the vehicle. This increase can be represented in a first gradient 66, wherein the increase in the first gradient indicates natural wear and therefore customary aging. Within the diagnostic range 70 the first gradient 66 remains essentially constant. When a fault occurs, a second gradient 72 for the mean values 62 exceeds a diagnostic threshold value 68. In comparison with the first gradient 66, the second gradient 72 is significantly steeper with respect to the mean values 62. In the event of the second gradient 72 for the mean values 62 exceeding the diagnostic threshold value 68 as exceeding of the threshold value, a fault entry is made in a fault memory. This entry in the fault memory initiates, for example, a limitation of the maximum torque, which is transmitted to the transmission 24 via the at least one electric machine 12 during acceleration phases 58. Instead of absolute values for the transmission backlash 40, the abovementioned first gradients 66 and second gradients 72 can also be used for diagnostics. In the case of slowly occurring changes within the scope of the first gradient 66 it is possible to infer customary aging on the basis of the wear of the components of the transmission 24, while in the case of fast changes, i.e. the detection of a second gradient 72, it is possible to infer increasing damage or sudden failure of components of the transmission 24. In this case, corresponding indications are output to the driver, which reduces the torque which is output by the at least one electric machine 12, and so on.

The method proposed according to the invention can be applied in simple braking interventions outside the intervention of an ABS system. The method proposed according to the invention can also be used within the scope of braking within a recuperation mode for converting kinetic energy of the vehicle into electrical energy for charging the traction battery if the ABS intervention occurs within actuation of the at least one electric machine 12. The method proposed according to the invention can also be transferred to multi-gear speed manual transmissions. In this context, the respectively occurring transmission backlash 40 is to be determined as a function of the gear stage. Furthermore, there is the possibility of transferring the method proposed according to the invention to other electric drive systems, for example to an electric steering system or to industrial drives.

The invention is not restricted to the exemplary embodiments described here and to the aspects highlighted therein. Instead, a multiplicity of refinements which are within the scope of the ability of a person skilled in the art are possible within the area specified by the claims.

The invention claimed is:

1. A method for determining the transmission backlash (40) of a transmission (24) which is coupled to an electric machine (12) of a vehicle, the method comprising the following steps:

a) detecting the rotational speed of the at least one electric machine (12) in the case of a driving intervention (80) and detecting fluctuations in rotational speed which originate therefrom, b) evaluating a high-frequency oscillation (60) generated by the transmission (24) reaching a lower stop (54) during deceleration phases (56) and by the transmission (24) reaching an upper stop (50) when there is a reversal of the direction of rotation in acceleration phases (58), c) filtering out high-frequency portions from the high-frequency oscillation (60) according to step b), at the occurrence of which position information (42) relating to an associated rotational angle from the rotational speed signal is stored, and d) evaluating a distance between the upper stop (52) and the lower stop (54) and determining the transmission backlash (40) from the difference between the position information (42) for the upper stop (52) and that for the lower stop (54).

2. The method as claimed in claim 1, wherein the driving intervention (80) is given by an ABS intervention, a simple braking intervention, or braking by means of recuperation.

3. The method as claimed in claim 1, wherein permanent storage of the transmission backlash (40) takes place as a function of the service life of the vehicle or the kilometerage (64) of the vehicle.

4. The method as claimed in claim 1, wherein instances of transmission backlash (40) are averaged over a plurality of driving interventions (80) over a specific driving distance, and a comparison of mean values (62) of the transmission backlash (40) is carried out.

5. The method as claimed in claim 4, wherein a first gradient for an increase of the mean values (62) of the transmission backlash (40) over a kilometerage value (64) permits customary aging of the transmission (24) and of the at least one electric machine (12) to be inferred.

6. The method as claimed in claim 4, wherein a second, steeper gradient (72) for the increase in the mean values (62) of the transmission backlash (40) and for the exceeding of a diagnostic threshold value (68) makes it possible to infer a defect in the transmission (24) and/or the at least one electric machine (12).

7. The method as claimed in claim 1, wherein when a diagnostic threshold value (68) is exceeded by a mean value (62) of the transmission backlash (40) an entry is made in a fault memory.

8. The method as claimed in claim 6, wherein a reduction in the torque of the at least one electric machine (12) is specified in an acceleration phase (58) of the vehicle.

9. The method as claimed in claim 1, wherein the mean values (62) of the transmission backlash (40) are taken into account in drivability functions, in particular anti-judder damping.

10. The method as claimed in claim 1, wherein the rotational speed signal according to step a) is subjected to frequency analysis, in particular to a fast-Fourier transformation, and a change in the transmission backlash (40) is inferred when high-frequency portions change.

* * * * *